Figure 8:
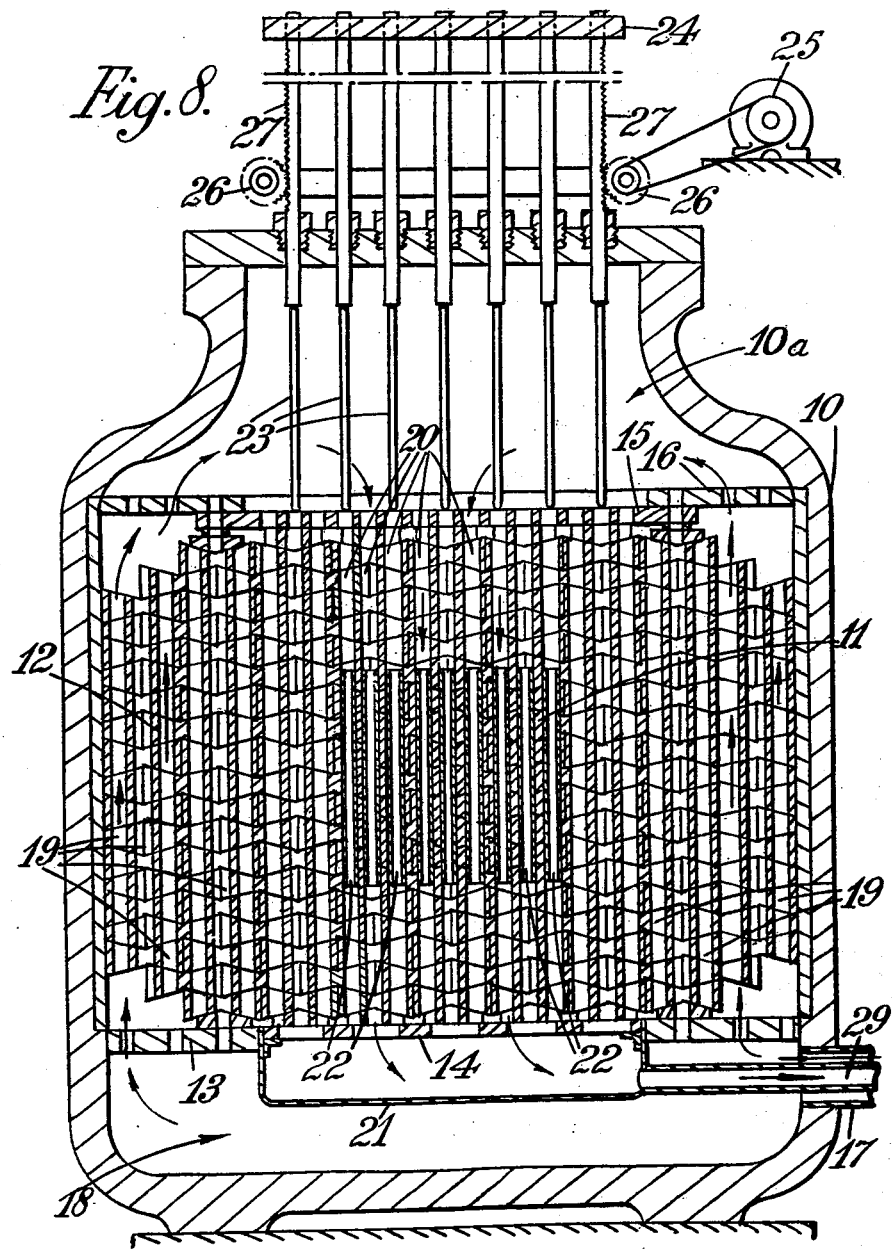

Nov. 28, 1961  N. BATTLE  3,010,888
BLOCKS FOR BUILDING PURPOSES AND STRUCTURE FORMED THEREFROM
Filed Jan. 20, 1958  3 Sheets-Sheet 1
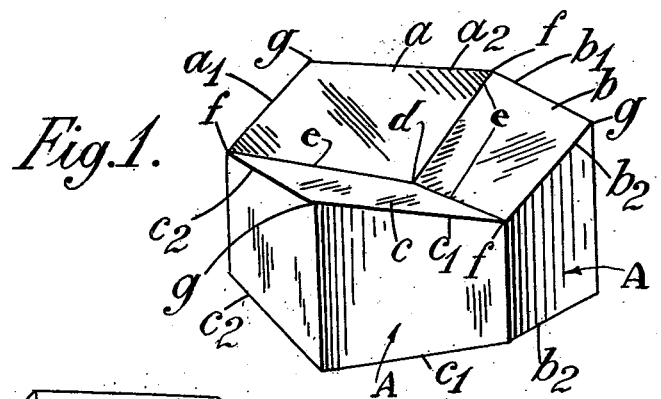
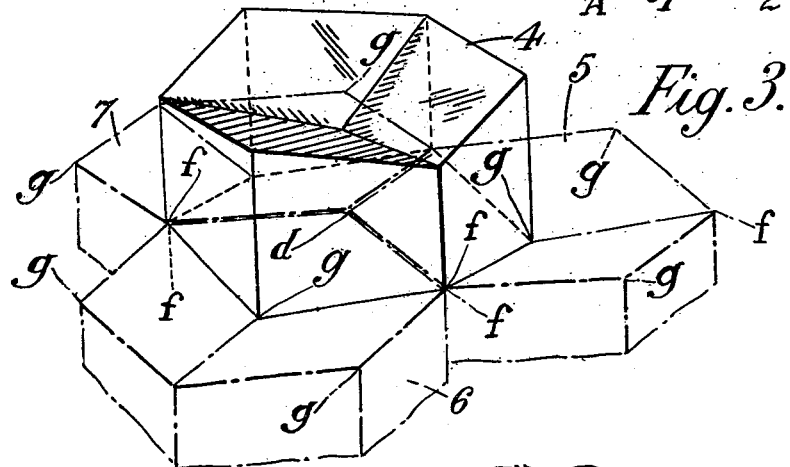
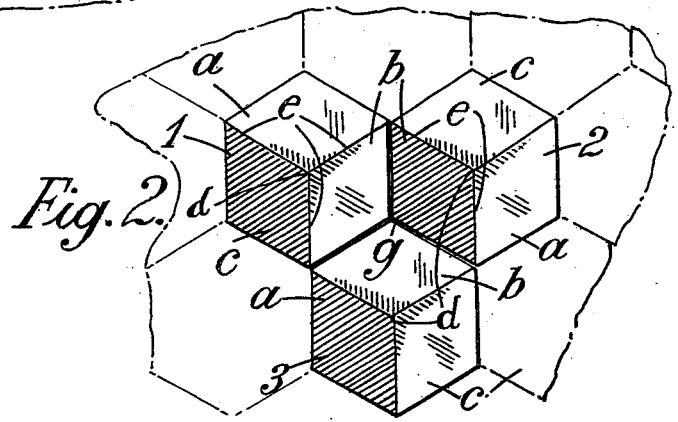

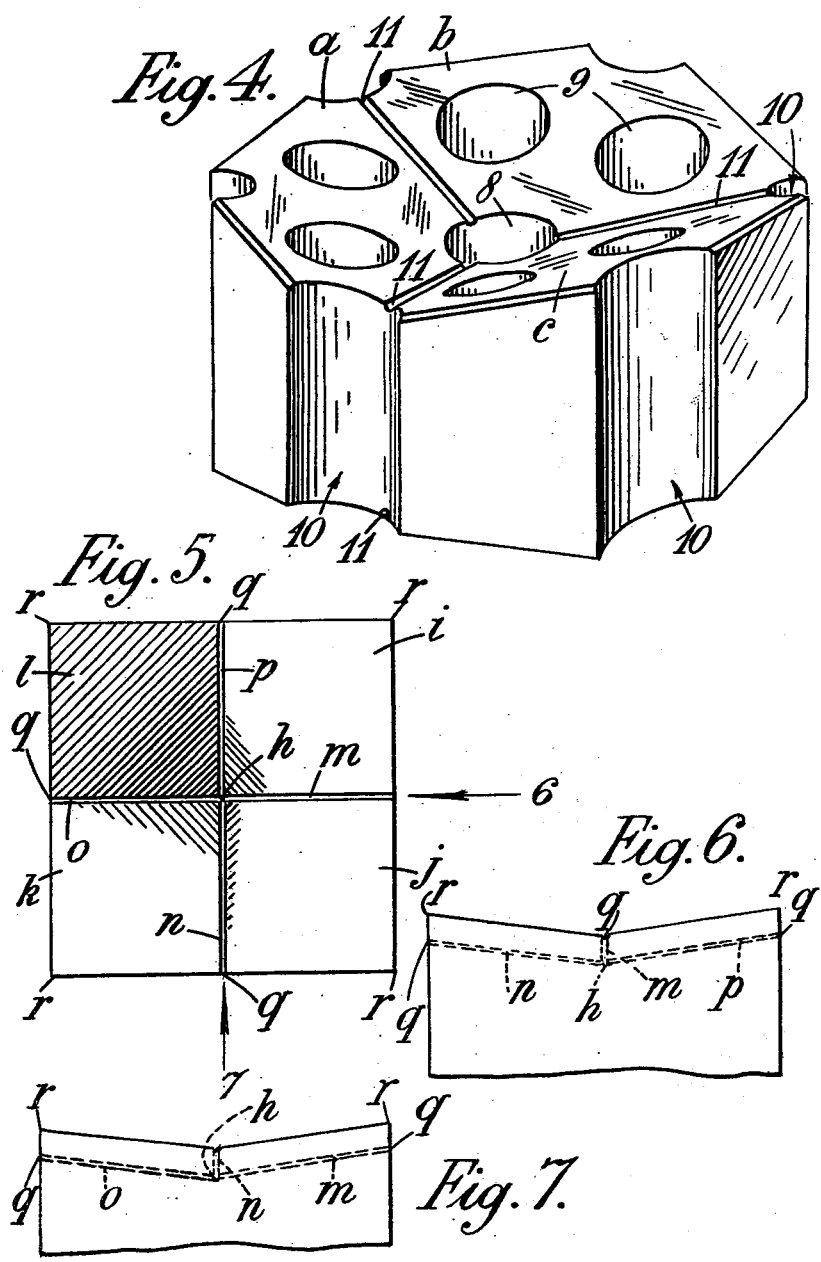

Nov. 28, 1961 N. BATTLE 3,010,888
BLOCKS FOR BUILDING PURPOSES AND STRUCTURE FORMED THEREFROM
Filed Jan. 20, 1958 3 Sheets-Sheet 3

United States Patent Office 3,010,888
Patented Nov. 28, 1961

3,010,888
BLOCKS FOR BUILDING PURPOSES AND
STRUCTURE FORMED THEREFROM
Norman Battle, Chilwell, England, assignor to Rolls-Royce Limited, Derby, England, a company of Great Britain
Filed Jan. 20, 1958, Ser. No. 710,070
Claims priority, application Great Britain Jan. 25, 1957
12 Claims. (Cl. 204—193.2)

This invention comprises improvements in or relating to blocks for building purposes and the invention consists in providing a block shaped so that a plurality of such blocks can readily be piled in layers to form a solid structure with the blocks firmly locked in the structure against lateral separation.

One application of the invention is in the construction of moderator masses of nuclear reactors in which case the blocks are formed from a material such as graphite. Another application is in the construction of shielding structures for nuclear reactors, in which case the blocks may be of concrete or lead.

Accordingly the invention provides a building block having basically a polygonal cross section such that a multiplicity of such blocks can be arranged in a solid layer with their side walls in contact and their side edges coincident, and having each end wall formed substantially as a pyramidal recess, the apices of the pyramidal recesses being on the centre line of the block, whereby a group of adjacent blocks in a layer will form a pyramidal projection from the surface of the layer to occupy the end recess in a superposed like block and whereby said adjacent blocks are locked against lateral separation.

According to the present invention in its preferred form, a block for building purposes is in the form of a regular hexagonal right prism whereof each of the two hexagonal end surfaces is a recess of triangular pyramid form with its apex on the axis of the block and with each of the plane surfaces which meet at the apex containing two adjacent edges of the end surface.

It will be clear that with such blocks a solid structure can be produced which comprises a plurality of superposed layers of blocks, with each block in a layer (except the blocks at the perimeter of the layer) having each of its side surfaces in firm contact with another block of the layer and with the end surface of each block overlapping and in firm contact with three blocks in an adjacent layer to lock them against lateral separation. It will be clear that a cluster of three blocks can be arranged to form by adjacent plane portions of their end surfaces a pyramid complementary to the pyramidal recess forming an end surface of a block, so that when a block forming part of one layer is placed in position on another layer the three blocks overlapped will be locked against lateral separation.

In another form, the block is square in horizontal section and each of its end walls is in the form of a pyramidal recess whereof the apex is on the centre line of the block and whereof the side edges of the pyramid lie on lines joining the mid points of the edges of the end wall. Thus the mid point of each edge is lower than the corners of the end wall and the centre point of the end wall is lower than the mid points. Also four blocks grouped about a vertical line present a pyramidal projection complementary to the recess in the end of a block, so that by placing a block on the group with the projection engaging the recess in the superposed block, the four blocks in the group are locked against lateral separation.

This invention also includes a nuclear reactor having a moderator mass built up from blocks as above set forth.

Two forms of block of this invention for use in construction of the moderator mass and shielding structures of a nuclear reactor are illustrated in the accompanying drawings in which—

FIGURE 1 is a perspective view of the basic geometrical form of one block.

FIGURE 2 is a diagrammatic plan showing a cluster of blocks and illustrating how the blocks are arranged relative to one another in a layer, FIGURE 3 is a diagram showing how blocks in a plurality of layers are superposed, FIGURE 4 is a view corresponding to FIGURE 1 of the finished block for the moderator mass of a nuclear reactor, FIGURE 5 is a plan view of a further form of block, FIGURES 6 and 7 are views of the block in the direction of arrows 6 and 7 respectively on FIGURE 5, and FIGURE 8 is a vertical section through a nuclear reactor having a moderator mass built up from blocks as shown in FIGURE 4.

Referring to FIGURE 1, the block is in the form of a right prism having a base which is a regular hexagon. Each end surface of the prism is a shallow recess formed geometrically by the intersection with the end of the right prism of a triangular based pyramid which is coaxial with the prism and is positioned so that the edges of the pyramid which meet at its apex, pass through alternate corners of the hexagonal end of the prism, the pyramid having its apex on the axis of the block and directed towards the opposite end of the block. Each of the plane surfaces $a$, $b$, $c$, of the pyramid which meet at the apex $d$, extends over 120° of the end surface and angularly between a pair of the bisectors $e$ of alternate angles of the end surface, which bisectors correspond to the side edges of the pyramid, so that each of the surfaces $a$, $b$, $c$ contains a pair of adjacent edges $a_1$, $a_2$; $b_1$, $b_2$; $c_1$, $c_2$ of the end surface. Also the planes $a$, $b$, $c$ meet the axis of the block at an acute angle such that the apex $d$ of the pyramid is lower than points $f$ at which edges $c_2$, $a_1$; $a_2$, $b_1$; $b_2$, $c_1$ meet, which are in turn lower than the points $g$ of intersection of the edges $a_1$, $a_2$; $b_1$, $b_2$; $c_1$, $c_2$.

If a layer of such blocks is formed, it will be clear that each side wall A of each block will be in contact and coincident with a side wall A of another block. Further when the blocks are arranged so that the points $f$ of contacting blocks are together, and likewise points $g$ are together, then the adjacent surfaces of the three blocks which have a common point $g$, form a projection complementary to the pyramidal recess forming the end surface of a block. Thus in FIGURE 2 each of the three blocks 1, 2, 3 has a point $g$ coincident with a point $g$ of the other two blocks, and their three surfaces $b$ form the side surfaces of a projection with its apex at $g$, and this projection will fit exactly an end recess in a superposed block (see FIGURE 3).

Thus if two such layers of blocks are superposed with the blocks of one layer overlapping three blocks of the other layer, each block of the upper layer will, by its weight and the inclination of the portions $a$, $b$, $c$ of the end surface restrain the three blocks it overlaps against lateral separation. Thus referring to FIGURE 3, the block 4 will restrain the three blocks 5, 6, 7 against lateral separation.

Referring now to FIGURE 4, there is shown a block for use in a moderator mass of a nuclear reactor, and the block is basically geometrically similar to the block shown in FIGURE 1. However, the block is formed with a central hole 8 and a ring of holes 9 around the central hole 8, and has at each corner a part-cylindrical channel 10. When a plurality of such blocks are assembled in layers in the manner described with reference to FIGURE 3, the holes 8 of one layer are aligned with holes formed each by three channels 10 in the adjacent layer or layers, and the holes 9 are aligned with corresponding holes in the adjacent layer or layers. The surfaces a, b, c forming the end of the block may be separated by shallow channels 11 which extend from the central hole 8 to alternate channels 10 to facilitate the production of the flat mating surfaces. The holes are provided to receive the fuel elements or other working parts of the nuclear reactor.

Conveniently, the moderator mass composed of a plurality of hexagonal blocks may itself be hexagonal in plan and at the edges the hexagon may be completed by filler pieces in the form of halves or thirds of the hexagonal blocks, the filler pieces interlocking with adjacent blocks and filler pieces in similar manner as with the complete blocks.

One form of nuclear reactor having a moderator mass formed from blocks as shown in FIGURE 4 will now be described with reference to FIGURE 8.

The reactor comprises a cylindrical steel casing 10 which houses the moderator mass affording the reactor core 11 and reflector 12. The moderator mass 11, 12 is a layered assembly of blocks, such as shown in FIGURE 4, and the moderator mass 11, 12 is supported on a perforated annular base plate 13 secured in the casing 10 at a level spaced from the bottom of the casing and on a grid 14 secured centrally of the base plate 13. A top grid 15 bears on the upper end of the moderator mass 11, 12 and the grid 15 is held in position by a perforated annular top plate 16 secured in the casing 10 adjacent its upper end.

Coolant, such as gas, is fed to the casing 10 through a connection 17 opening into the space 18 below the base plate 13, and the coolant flows upwardly through the bores 19 in the outer annulus of the moderator mass 11, 12 into an upper casing space 10a and then downwardly through the bores 20 in the central part of the moderator mass 11, 12 into a collector manifold 21 supported below the grid 14. An outlet connection 29 extends from the manifold 21 coaxially through the supply connection 17.

The fuel elements 22 of the reactor are accommodated in some of the bores 20 in the core 11 of the reactor.

The reactor also comprises control means including a plurality of rods 23 of neutron-absorbing material carried by a frame 24 movable vertically by a motor 25 through pinions 26 and racks 27 to vary the extent by which the rods 23 project into the bores in the reflector 12.

Referring to FIGURES 5 to 7, there is shown a block of square cross-section so that a layer can be formed with the side walls of the blocks in contact and their side edges coincident, the block having each end wall formed as a recess produced geometrically by the intersection of a square based pyramid with the block, the pyramid and block being coaxial. The pyramid has its apex h at the centre of the end wall and has four plane side surfaces i, j, k, l which intersect in lines m, n, o, p joining the mid points q of the side edges of the end surface as viewed in plan. Thus the corners r of the end wall are above the level of the mid points q which are in turn above the centre point h.

Thus if a group of four such blocks are arranged say with their respective surfaces i adjacent, the surfaces i form a projection of basically pyramidal form complementary to the recess in the end of a block, and thus a block superposed to overlap adjacent corners r of the blocks in the group will restrain the four blocks against lateral separation.

If the nuclear reactor of which the moderator mass forms part is used in a vehicle, for example, a ship, it is necessary to provide some means for applying a distributed downward load to the top of the moderator mass to keep its constituent blocks compacted in the event of vertical accelerations being imposed on the moderator. For this purpose, loading piles in the form of pyramids of blocks with their bases covering the whole of the upper surface of the moderator mass may be built up, to the top of each of which a downward load is applied. This presents the advantage that the top of the moderator mass is accessible between the bases of the loading piles.

I claim:
1. A building block of a regular hexagonal right prism form having hexagonal-plan end walls and plane side walls joining the end walls, whereby a multiplicity of such blocks can be arranged in a solid layer with their side walls in contact and the edges of the walls coincident, each end wall consisting of three plane surface portions defining a recess therein, the three surface portions being equally inclined to the axis of the block which joins the centers of the end walls, and said three surface portions of each end wall meeting on lines which are bisectors of alternate angles of the hexagonal-plan end wall and meet on the said axis at a point nearer the other end wall than the angles of the end wall.

2. A building block of a right prism form having square-plan end walls and plane side walls joining the edges of the end walls whereby a multiplicity of such blocks can be arranged in a solid layer with their side walls in contact and the edges of the walls coincident, each square-plan end wall consisting of four plane surface portions defining a recess therein, the four surface portions being equally inclined to the axis of the block which joins the centers of the end walls, and the said four surface portions meeting on lines which when viewed in plan join the mid points of the sides of the square-plan end wall to its center, the said lines intersecting on the said axis at a point nearer the other wall than said mid points and the corners of the square-plan end wall.

3. A building block of right regular hexagonal prism form and having a pair of oppositely-facing end surfaces, each having six edges in regular hexagon relationship, and six side surfaces joining corresponding edges of the end surfaces, each end surface being formed by three plane surface portions, each of which surface portions is bounded by an adjacent pair of the edges of the end surface and by a pair of lines which extend from the center of the end surface to the ends of the pair of edges remote from their point of intersection, and is inclined to a line joining the center points of the end surfaces, whereby each end surface is in the form of a triangular-based pyramidal recess.

4. A building block according to claim 3, wherein the side surfaces of the block are connected by part-circular section channels extending along the block from one end surface to the other.

5. A building block according to claim 4, comprising also a plurality of bores extending axially through the block from one end surface to the other.

6. A solid structure comprising a plurality of layers of identical building blocks of right regular hexagonal prism form, each building block having a pair of oppositely-facing end surfaces, each having six edges in regular hexagon relationship, and six side surfaces joining corresponding edges of the end surfaces, each end surface being formed by three plane surface portions, each of which surface portions is bounded by an adjacent pair of the edges of the end surface and by a pair of lines which extend from the center of the end surface to the ends of the pair of edges remote from their point of intersection, and is inclined to a line joining the center points of the end surfaces, whereby each end surface is in the form of a triangular-based pyramidal recess, the blocks in each layer having their side surfaces in contact and their adjacent edges of their end surface coincident, whereby there is formed in each layer a plurality of groups of three mutually contacting blocks whereof the adjacent surface portions form pyramidal projections extending from the layer, and the blocks in each pair of adjacent layers being superimposed with the pyramidal projections formed by the groups in one layer occupying the pyramidal recesses in the end surfaces of the blocks of the other layer.

7. A building block of right rectangular prism form having a pair of oppositely-facing end surfaces, each having four edges, and four side surfaces joining corresponding edges of the end surfaces, each end surface being formed by four plane surface portions, each plane surface portion being bounded by a pair of lines joining the mid points of an adjacent pair of the edges and by the portions of the edges extending between the mid points to the point of intersection of the pair of edges, and each plane surface portion is inclined to the line joining the center points of the pair of end surfaces, whereby each end surface is in the form of a rectangular based pyramidal recess.

8. A solid structure comprising a plurality of layers of identical building blocks of right rectangular prism form, each block having a pair of oppositely-facing end surfaces, each having four edges, and four side surfaces joining corresponding edges of the end surfaces, each end surface being formed by four plane surface portions, each plane surface portion being bounded by a pair of lines joining the mid points of an adjacent pair of the edges and by the portions of the edges extending between the mid points to the point of intersection of the pair of edges, and each plane surface portion is inclined to the line joining the center points of the pair of end surfaces, whereby each end surface is in the form of a rectangular based pyramidal recess, the blocks in each layer having their side surfaces in contact and their adjacent edges coincident, whereby there is formed in each layer a plurality of groups of four blocks whereof the adjacent surface portions form pyramidal projections extending from the layer and complementary to the pyramidal recess in the end surface of each block, and the blocks in each pair of adjacent layers being superimposed with the pyramidal projections formed by the groups in one layer occupying the pyramidal recesses in the end surfaces of the blocks of the other layer.

9. A building block of right regular prism form having a pair of polygonal end surfaces having a number of edges selected from four and six, and a corresponding number of side surfaces joining the edges of the end surfaces, whereby a plurality of such blocks may be arranged in a layer with their side surfaces coincident, each end surface being formed by a plurality of identical surface portions, each of which surface portions is bounded by a part at least of each of an adjacent pair of the edges and by a pair of lines joining the center of the end surface and the edges, said pair of lines forming the junctions of the surface portion with the adjacent surface portions, and said surface portions being equally inclined to a line joining the centers of the end surfaces, whereby each end surface is in the form of a pyramidal recess.

10. A solid structure comprising a plurality of layers of identical building blocks of right regular prism form, each block having a pair of polygonal end surfaces having a number of edges selected from four and six, and a corresponding number of side surfaces joining the edges of the end surfaces, each end surface being formed by a plurality of identical surface portions, each of which surface portions is bounded by a part at least of each of an adjacent pair of the edges and by a pair of lines joining the center of the end surface and the edges, said pair of lines forming the junctions of the surface portion with the adjacent surface portions, and said surface portions being equally inclined to a line joining the centers of the end surfaces, whereby each end surface is in the form of a pyramidal recess, the blocks in each layer having their side surfaces in contact and their adjacent edges coincident, whereby there is formed in each layer a plurality of groups of mutually contacting blocks whereof the adjacent end surface portions form pyramidal projections from the layer, each of which projections is complementary to the pyramidal recess in the end surface of a block, and the blocks in each pair of adjacent layers being superimposed with the pyramidal projections formed by said groups of one layer occupying the pyramidal recesses in the end surfaces of the blocks of the other layer.

11. A building block of right regular prism form having a pair of polygonal end surfaces, each end surface being defined by a number $n$ of pairs of parallel edges, the number $n$ being an integer greater than 1 and less than 4, and the lengths of alternate edges of the polygon being equal, and a corresponding number of side surfaces joining the edges of the end surfaces, whereby a plurality of such blocks may be arranged in a layer with their side surfaces coincident, each end surface being formed by a plurality of identical surface portions, each of which surface portions is bounded by a part at least of each of an adjacent pair of the edges and by a pair of lines joining the center of the end surface and the edges, said pair of lines forming the junctions of the surface portion with the adjacent surface portions, and said surface portions being equally inclined to a line joining the centers of the end surfaces, whereby each end surface is in the form of a pyramidal recess.

12. A solid structure comprising a plurality of layers of identical building blocks of right regular prism form, each block having a pair of polygonal end surfaces, each end surface being defined by a number $n$ of pairs of parallel edges, the number $n$ being an integer greater than 1 and less than 4, and the lengths of alternate edges of polygon being equal, and a corresponding number of side surfaces joining the edges of the end surfaces, each end surface being formed by a plurality of identical surface portions, each of which surface portions is bounded by a part at least of each of an adjacent pair of the edges and by a pair of lines joining the center of the end surface and the edges, said pair of lines forming the junctions of the surface portion with the adjacent surface portions, and said surface portions being equally inclined to a line joining the centers of the end surfaces, whereby each end surface is in the form of a pyramidal recess, the blocks in each layer having their side surfaces in contact and their adjacent edges coincident, whereby there is formed in each layer a plurality of groups of mutually contacting blocks whereof the adjacent end surface portions from pyramidal projections from the layer, each of which projections is complementary to the pyramidal recess in the end surface of a block, and the blocks in each pair of adjacent layers being superimposed with the pyramidal projections formed by said groups of one layer occupying the pyramidal recesses in the end surfaces of the blocks of the other layer.

References Cited in the file of this patent
UNITED STATES PATENTS

| | | |
|---|---|---|
| 2,082,457 | Martinichio | June 1, 1937 |
| 2,295,352 | MacDonald | Sept. 8, 1942 |
| 2,440,836 | Turngren | May 4, 1948 |
| 2,708,656 | Fermi et al. | May 17, 1955 |